United States Patent
Ochiai et al.

(10) Patent No.: US 11,261,326 B2
(45) Date of Patent: Mar. 1, 2022

(54) POLYAMIDE RESIN COMPOSITION FOR EXTRUSION MOLDED PRODUCTS EXPOSED TO HIGH-PRESSURE HYDROGEN, AND EXTRUSION MOLDED PRODUCT

(71) Applicant: Toray Industries, Inc., Tokyo (JP)

(72) Inventors: Shinichiro Ochiai, Nagoya (JP); Shota Suzuki, Nagoya (JP); Sadayuki Kobayashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/262,036

(22) PCT Filed: Jul. 29, 2019

(86) PCT No.: PCT/JP2019/029609
§ 371 (c)(1),
(2) Date: Jan. 21, 2021

(87) PCT Pub. No.: WO2020/027032
PCT Pub. Date: Feb. 6, 2020

(65) Prior Publication Data
US 2021/0246307 A1 Aug. 12, 2021

(30) Foreign Application Priority Data
Jul. 31, 2018 (JP) .............................. JP2018-143658

(51) Int. Cl.
| | |
|---|---|
| C08L 77/02 | (2006.01) |
| B29C 48/09 | (2019.01) |
| B29C 48/00 | (2019.01) |
| C08L 77/06 | (2006.01) |
| C08L 23/26 | (2006.01) |
| C08K 3/014 | (2018.01) |
| C08K 13/02 | (2006.01) |
| C08K 3/105 | (2018.01) |
| B29K 77/00 | (2006.01) |
| B29K 105/00 | (2006.01) |
| B29L 31/00 | (2006.01) |
| F17C 1/16 | (2006.01) |

(52) U.S. Cl.
CPC .......... *C08L 77/02* (2013.01); *B29C 48/0021* (2019.02); *B29C 48/09* (2019.02); *C08K 3/014* (2018.01); *C08K 3/105* (2018.01); *C08K 13/02* (2013.01); *C08L 23/26* (2013.01); *C08L 77/06* (2013.01); *B29K 2077/00* (2013.01); *B29K 2105/0005* (2013.01); *B29L 2031/7156* (2013.01); *F17C 1/16* (2013.01)

(58) Field of Classification Search
CPC .......... C08L 77/02; C08L 77/00; C08L 77/06; C08K 3/014; C08K 3/10; C08K 3/105; C08K 3/16; C08K 13/02; C08J 5/00; C08J 5/12; F17C 1/16; F17C 1/005; F17C 2201/0104; B32B 27/34
See application file for complete search history.

(56) References Cited

U.S. PATENT DOCUMENTS

| | | | | |
|---|---|---|---|---|
| 5,789,529 | A * | 8/1998 | Matsumura | .......... C08K 5/0016 524/514 |
| 8,053,523 | B2 * | 11/2011 | Fukui | .................... B29C 45/006 525/66 |
| 2005/0131129 | A1 * | 6/2005 | Uehara | ............... C08L 2666/24 524/502 |
| 2009/0203845 | A1 | 8/2009 | Fukui et al. | |
| 2014/0034654 | A1 | 2/2014 | Dullaert et al. | |
| 2015/0329670 | A1 | 11/2015 | Washio et al. | |
| 2016/0297120 | A1 * | 10/2016 | Lamberts | ................. C08K 7/06 |
| 2017/0029620 | A1 * | 2/2017 | Sato | ........................ F17C 13/04 |
| 2017/0335999 | A1 | 11/2017 | Ochiai et al. | |

FOREIGN PATENT DOCUMENTS

| | | |
|---|---|---|
| JP | 2002-179910 | 6/2002 |
| JP | 2009-191871 | 8/2009 |
| JP | 2014-501818 | 1/2014 |
| JP | 2017-088661 | 5/2017 |
| JP | 2017-226817 | 12/2017 |
| WO | 2014/073219 | 5/2014 |
| WO | 2016/080151 | 5/2016 |
| WO | WO 2016/080151 A1 * | 5/2016 .............. C08L 77/06 |
| WO | WO 2016/136025 A1 * | 9/2016 .............. C08L 77/02 |

\* cited by examiner

*Primary Examiner* — Jane L Stanley
(74) *Attorney, Agent, or Firm* — DLA Piper LLP (US)

(57) ABSTRACT

A polyamide resin composition for an extrusion-molded article exposed to high-pressure hydrogen gas contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B). The polyamide resin composition has a melt tension of 20 mN or more when measured at 260° C. and a take-up speed at strand break of 30 m/min or more when measured at 260° C.

5 Claims, No Drawings

POLYAMIDE RESIN COMPOSITION FOR EXTRUSION MOLDED PRODUCTS EXPOSED TO HIGH-PRESSURE HYDROGEN, AND EXTRUSION MOLDED PRODUCT

TECHNICAL FIELD

This disclosure relates to a polyamide resin composition for an extrusion-molded article exposed to high-pressure hydrogen gas that contains specific amounts of a polyamide 6 resin, an impact modifier, and a metal halide, and is controlled to a specific melt tension and take-up speed at strand broke, and an extrusion-molded article obtained by molding the same.

BACKGROUND

In recent years, to respond to depletion of petroleum fuels and demand for reduction of an amount of emission of harmful gas, fuel cell electric vehicles have attracted attention, in which fuel cells generating electricity by electrochemically reacting hydrogen gas with oxygen gas in the air are installed in automobiles, and the electricity generated by the fuel cells is supplied to a motor to provide a driving force. As a tank for high-pressure hydrogen gas mounted in the fuel cell electric vehicle, a resin tank has been studied, in which the outside of a resin liner is reinforced with a carbon fiber reinforced resin. However, hydrogen gas having a small molecular size is apt to permeate through the resin compared to natural gas having a relatively large molecular size, and the amount of high-pressure hydrogen gas accumulated in the resin is more than that of normal-pressure hydrogen gas. This causes a problem that the conventional resin tank is deformed or destroyed if charging and discharging of high-pressure hydrogen gas are repeated.

As a material for hydrogen gas tank liners having excellent gas barrier properties and excellent impact resistance even at low temperatures, for example, a material for hydrogen gas tank liners composed of a polyamide resin composition containing polyamide 6, a copolymerized polyamide, and an impact modifier has been studied (see, for example, Japanese Patent Laid-Open Publication No. 2009-191871).

As a liner for gas storage tanks having excellent gas barrier properties, for example, a liner for gas storage tanks containing a polymer composition containing a polyamide, a nucleating agent, and an impact resistance modifier has been studied (for example, National Publication of International Patent Application No. 2014-501818).

Examples of a method of producing a molded article exposed to high-pressure hydrogen gas include injection-molding, extrusion-molding, and blow-molding. In particular, when a long tank liner is molded, a torso part of the tank liner may be molded by extrusion-molding, but when drawdown may occur during the extrusion-molding, which makes it impossible to provide a molded article, or causes a non-uniform thickness. Therefore, to extrusion-mold the torso part of the long tank liner, a material having excellent extrusion moldability such as drawdown resistance is required.

Furthermore, the extrusion-molding tends to have a longer detention time during molding than that of the injection-molding so that a resin may be decomposed during the detention to reduce the toughness of the molded article. Therefore, for a resin composition for extrusion-molding, a material that is less likely to be decomposed during detention is required. Furthermore, when the extrusion-molded article is obtained and the thickness deviation of the obtained extrusion-molded article occurs, defects and cracks may occur from thin locations when charging and discharging of high-pressure hydrogen gas are repeated. Therefore, the resin composition for extrusion-molding exposed to high-pressure hydrogen gas is required not to generate the thickness deviation after molding. In the extrusion molding, non-uniform extrusion/taking-up is apt to cause thickness deviation. One of factors causing the non-uniform extrusion/taking-up is a low melt tension.

However, the hydrogen gas tank liner described in Japanese Patent Laid-Open Publication No. 2009-191871 is apt to cause permeation of hydrogen gas and dissolution of hydrogen gas in a resin. That disadvantageously causes defects in the hydrogen gas tank liner if charging and discharging of high-pressure hydrogen gas are repeated. The polyamide resin composition disadvantageously has a low melt tension and poor drawdown resistance, which cannot provide an extrusion-molded article.

The liner for gas storage tanks described in National Publication of International Patent Application No. 2014-501818 has excellent helium gas permeation resistance, but the liner is apt to cause permeation of hydrogen gas and dissolution of hydrogen gas in a resin, which disadvantageously causes defects in the hydrogen gas tank liner if charging and discharging of high-pressure hydrogen gas are repeated. The polyamide resin composition disadvantageously has a low melt tension and poor drawdown resistance, which cannot provide an extrusion-molded article.

In view of the above problems of the conventional techniques, it could be helpful to provide a polyamide resin composition which has excellent extrusion moldability and melt stability, suppresses the thickness deviation of a molded article low, and can provide an extrusion-molded article suppressing the occurrence of defects even if charging and discharging of high-pressure hydrogen gas are repeated.

SUMMARY

We thus provide:

A polyamide resin composition for an extrusion-molded article exposed to high-pressure hydrogen gas, the polyamide resin composition contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B), wherein the polyamide resin composition has a melt tension of 20 mN or more when measured at 260° C. and a take-up speed at strand break of 30 m/min or more when measured at 260° C.

A polyamide resin composition for an extrusion-molded article, wherein the polyamide 6 resin (A) has a relative viscosity ($\eta r$) of 3.3 to 7.0 at a temperature of 25° C. in a 98% sulfuric acid solution having a resin concentration of 0.01 g/ml. An ethylene/α-olefin copolymer modified with an unsaturated carboxylic acid and/or its derivative is used as the impact modifier (B). Furthermore, the polyamide resin composition for an extrusion-molded article, wherein an amount of the unsaturated carboxylic acid and/or its derivative introduced from the modification is 0.1 to 3.0 parts by weight with respect to 100 parts by weight of the ethylene/α-olefin copolymer modified with the unsaturated carboxylic acid and/or its derivative.

An extrusion-molded article exposed to high-pressure hydrogen gas containing the polyamide resin composition.

Since the polyamide resin composition for an extrusion-molded article exposed to high-pressure hydrogen gas has a high melt tension and excellent drawdown resistance, and can withstand a high take-up speed, the polyamide resin composition can provide an extrusion-molded article which has low thickness deviation and excellent extrusion moldability, is less likely to cause thickness deviation after molding, suppresses the occurrence of defects even if charging and discharging of high-pressure hydrogen gas are repeated, and has excellent melt stability.

Since the thickness deviation of our extrusion-molded article is suppressed low, defects are less likely to occur even if charging and discharging of high-pressure hydrogen gas are repeated, and the feature of excellent melt stability is utilized, whereby the extrusion-molded article can be usefully developed as an extrusion-molded article used for applications in which the extrusion-molded article is exposed to the high-pressure hydrogen gas.

DETAILED DESCRIPTION

Hereinafter, our compositions and extrusion-molded products are described in more detail.

A polyamide resin composition for an extrusion-molded article exposed to high-pressure hydrogen gas (hereinafter, may be described as "polyamide resin composition"), contains: 70 to 99 parts by weight of a polyamide 6 resin (A); 1 to 30 parts by weight of an impact modifier (B); and 0.005 to 1 parts by weight of a metal halide (C) with respect to a total of 100 parts by weight of the polyamide 6 resin (A) and the impact modifier (B). The polyamide resin composition has a melt tension of 20 mN or more when measured at 260° C. and a take-up speed at strand break of 30 m/min or more when measured at 260° C. That is, when the polyamide resin composition is melted at 260° C. and discharged, the polyamide resin composition can be taken up without being broken when the take-up speed is 30 m/min or less.

First, the features of the polyamide 6 resin (A) and the impact modifier (B) will be schematically described.

The polyamide 6 resin (A) has an excellent balance among moldability, gas barrier properties, rigidity, and toughness. The polyamide 6 resin (A) can withstand a high take-up speed, but if the relative viscosity of the polyamide 6 resin (A) is too high to increase the melt tension, kneading defectiveness is apt to occur. Furthermore, the polyamide 6 resin (A) has a high crystallinity and can suppress permeation of hydrogen gas and dissolution of hydrogen in the resin, whereby a polyamide resin composition can be provided that can provide an extrusion-molded article in which defects are less likely to occur even if charging and discharging of high-pressure hydrogen gas are repeated.

The impact modifier (B) desirably has good compatibility with the polyamide 6 resin (A), and a small dispersion diameter when kneaded with the polyamide 6 resin (A). We found that the melt tension of the polyamide resin composition at a high temperature can serve as an index. The polyamide composition containing the polyamide 6 resin (A) and the impact modifier (B) has a high melt tension and, as a result, the polyamide composition has excellent drawdown resistance and sufficient flowability even at a high take-up speed, whereby thickness deviation is less likely to occur. A specific amount of the impact modifier (B) is blended with the polyamide 6 resin (A), to provide a polyamide resin composition having improved toughness. An extrusion-molded article used for applications in which the extrusion-molded article is exposed to high-pressure hydrogen gas repeatedly shrinks and expands during charging and discharging of high-pressure hydrogen gas, which is apt to cause cracks. A specific amount of the impact modifier (B) is blended, whereby even if the blow-molded article repeatedly shrinks and expands during charging and discharging of high-pressure hydrogen gas, the cracks of the blow-molded article can be suppressed.

Furthermore, a specific amount of the metal halide (C) is blended, whereby the melt stability of the polyamide resin composition can be improved. The extrusion-molded article used for applications in which the extrusion-molded article is exposed to high-pressure hydrogen gas has a long detention time during extrusion-molding, which is apt to cause the extrusion-molded article having deteriorated toughness. A specific amount of the metal halide (C) is blended, whereby, even if the detention time is long during such extrusion-molding, the deteriorated toughness of the extrusion-molded article can be suppressed.

Polyamide 6 Resin (A)

The polyamide 6 resin (A) is a polyamide resin mainly composed of 6-aminocaproic acid and/or ε-caprolactam. Other monomers may be copolymerized as long as the desired effect is not impaired. "Mainly composed of" means that units derived from 6-aminocaproic acid or units derived from ε-caprolactam are contained in a total amount of 50 mol % or more with respect to a total of 100 mol % of monomer units constituting the polyamide resin. The units derived from 6-aminocaproic acid or the units derived from ε-caprolactam are more preferably contained in an amount of 70 mol % or more, and still more preferably 90 mol % or more.

Examples of other monomers to be copolymerized include amino acids such as 11-aminoundecanoic acid, 12-aminododecanoic acid, and p-aminomethylbenzoic acid; lactams such as ω-laurolactam; aliphatic diamines such as tetramethylenediamine, pentamethylenediamine, hexamethylenediamine, 2-methylpentamethylenediamine, undecamethylenediamine, dodecamethylenediamine, 2,2,4-2,4,4-trimethylhexamethylenediamine, and 5-methylnonamethylenediamine; aromatic diamines such as m-xylenediamine and p-xylylenediamine; alicyclic diamines such as 1,3-bis(aminomethyl) cyclohexane, 1,4-bis(aminomethyl) cyclohexane, 1-amino-3-aminomethyl-3,5,5-trimethylcyclohexane, bis(4-aminocyclohexyl) methane, bis(3-methyl-4-aminocyclohexyl) methane, 2,2-bis(4-aminocyclohexyl) propane, bis(aminopropyl) piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, 1,2-cyclohexanedicarboxylic acid, and 1,3-cyclopentanedicarboxylic acid. Two or more of these monomers may be copolymerized.

The degree of polymerization of the polyamide 6 resin (A) is not particularly limited, but the polyamide 6 resin (A) preferably has a relative viscosity of 3.3 to 7.0, as measured at 25° C. in a 98% concentrated sulfuric acid solution having a resin concentration of 0.01 g/ml. A relative viscosity of 3.3 or more provides the polyamide resin composition having a moderately high melt tension during extrusion-molding that can provide the polyamide resin composition having further improved drawdown properties. Furthermore, the relative viscosity is more preferably 4.0 or more. Meanwhile, a relative viscosity of 7.0 or less provides the polyamide resin composition having a moderately low melt viscosity during extrusion-molding that can provide the polyamide resin composition having further improved extrusion moldability.

The amount of an amino terminal group of the polyamide 6 resin (A) is not particularly limited, but it is preferably $1.0\times10^{-5}$ to $10.0\times10^{-5}$ mol/g. The amount of the amino terminal group of $1.0\times10^{-5}$ to $10.0\times10^{-5}$ mol/g provides a sufficient degree of polymerization that can provide the extrusion-molded article having improved mechanical strength. The amount of the amino terminal group of the polyamide 6 resin (A) can be determined by dissolving the polyamide 6 resin (A) in a mixed solvent of phenol and ethanol (83.5:16.5 (volume ratio)) and titrating the resulting solution using a 0.02N aqueous hydrochloric acid solution.

Impact Modifier (B)

The impact modifier (B) refers to a polymer having a glass transition temperature of 0° C. or lower. The glass transition temperature can be obtained from an inflection point which occurs when a temperature rises at a temperature rise rate of 20° C./min with a measurement start temperature as −70° C. using a differential scanning calorimeter (DSC). Examples of the impact modifier (B) include olefin resins, acrylic rubber, silicone rubber, fluorine rubber, styrene rubber, nitrile rubber, vinyl rubber, urethane rubber, polyamide elastomers, polyester elastomers, and ionomers. Two or more of these may be blended.

Among these, olefin resins are preferably used because these have excellent compatibility with the polyamide 6 resin (A) and a high toughness improving effect. The olefin resins are thermoplastic resins obtained by polymerizing olefin monomers such as ethylene, propylene, butene, isoprene, and pentene. Copolymers of two or more olefin monomers may also be used, and copolymers of these olefin monomers and other monomers may also be used. Specific examples of the olefin resins include polymers such as polyethylene, polypropylene, polystyrene, poly(1-butene), poly(1-pentene), and polymethylpentene, and copolymers thereof; and ethylene/α-olefin copolymers, ethylene/α,β-unsaturated carboxylate copolymers, α-olefin/α,β-unsaturated carboxylate copolymers, polyolefins obtained by hydrolyzing at least a portion of a copolymer of (ethylene and/or propylene) and a vinyl alcohol ester, copolymers of (ethylene and/or propylene) and (unsaturated carboxylic acid and/or unsaturated carboxylate), polyolefins obtained by substituting at least some of carboxyl groups of copolymers of (ethylene and/or propylene) and (unsaturated carboxylic acid and/or unsaturated carboxylate) with metal ions, block copolymers of conjugated dienes and vinyl aromatic hydrocarbons, and hydrides thereof. Among these, ethylene/α-olefin copolymers and ethylene/α,β-unsaturated carboxylate copolymers are more preferable, and ethylene/α-olefin copolymers are still more preferable.

The above-described olefin resins are desirably modified with an unsaturated carboxylic acid and/or its derivative. As described above, the impact modifier (B) desirably has good compatibility with the polyamide 6 resin (A) and a small dispersion diameter when kneaded with the polyamide 6 resin (A), but to reduce the dispersion diameter, the points are the amount of the impact modifier (B) to be mixed with the polyamide 6 resin (A) and the type of an elastomer of the impact modifier (B). For example, the impact modifier modified with an unsaturated carboxylic acid and/or its derivative has good reactivity with the polyamide 6 resin to provide improved compatibility with the polyamide 6 resin.

The derivative of an unsaturated carboxylic acid is an unsaturated carboxylic acid compound having a carboxyl group whose a hydroxy moiety is substituted with any other substituent, and examples thereof include metal salts, acid halides, esters, acid anhydrides, amides, and imides of unsaturated carboxylic acids. Such a modified olefin resin can be used to further improve the compatibility with the polyamide 6 resin (A), to provide further improved extrusion moldability. Examples of the unsaturated carboxylic acid and its derivative include acrylic acid, methacrylic acid, maleic acid, fumaric acid, itaconic acid, crotonic acid, methyl maleic acid, methyl fumaric acid, mesaconic acid, citraconic acid, glutaconic acid, and metal salts of these carboxylic acids; unsaturated carboxylates such as methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, and dimethyl itaconate; acid anhydrides such as maleic anhydride, itaconic anhydride, citraconic anhydride, endo-bicyclo-(2,2,1)-5-heptene-2,3-dicarboxylic acid, and endo-bicyclo-(2,2,1)-5-heptene-2,3-dicarboxylic anhydride; and maleimide, N-ethylmaleimide, N-butylmaleimide, N-phenylmaleimide, glycidyl acrylate, glycidyl methacrylate, glycidyl ethacrylate, glycidyl itaconate, glycidyl citraconate, and 5-norbornene-2,3-dicarboxylic acid. Among these, the unsaturated dicarboxylic acid and its acid anhydride are preferable, and maleic acid or maleic anhydride are particularly preferable.

The unsaturated carboxylic acid or its derivative can be introduced into the olefin resin, for example, by copolymerization of an olefin monomer and an unsaturated carboxylic acid and/or its derivative or by graft introduction of an unsaturated carboxylic acid and/or its derivative into an unmodified olefin resin using a radical initiator.

Some olefin resins into which an unsaturated carboxylic acid and/or its derivative component are/is introduced also contribute to dispersion of an elastomer in the polyamide 6 resin in addition to improvement in impact resistance, to have an effect of reducing thickness deviation when a molded article is molded from the composition.

Regarding the introduction amount of the unsaturated carboxylic acid and/or its derivative component, for example, the amount of the unsaturated carboxylic acid and/or its derivative is preferably 0.1 to 3 parts by weight with respect to 100 parts by weight of the olefin resin. Specifically, it is preferable that, by the unsaturated carboxylic acid and/or its derivative, the unsaturated carboxylic acid and/or its derivative are/is introduced, and when the weight of the ethylene/α-olefin copolymer modified with the unsaturated carboxylic acid and/or its derivative is 100 parts by weight, the weight of a portion modified with the unsaturated carboxylic acid and/or its derivative introduced is 0.1 to 3.0 parts by weight. Furthermore, the weight of the portion modified with the unsaturated carboxylic acid and/or its derivative is more preferably 0.3 parts by weight to 2.5 parts by weight.

In the weight range of the portion modified with the unsaturated carboxylic acid and/or its derivative, when the polyamide 6 resin (A) and the impact modifier (B) are kneaded, the diameter of dispersed particle of the impact modifier (B) becomes small. The dispersion diameter will be described later.

As the effect, the weight of 0.1 parts by weight or more provides improved compatibility with the polyamide 6 resin (A), the impact modifier (B) having a small dispersion diameter and a high melt tension, which is less likely to disadvantageously cause drawdown during extrusion-molding. Furthermore, the take-up speed at strand break increases, to be less likely to disadvantageously cause the extrusion-molded article having an uneven thickness, which is preferable. By setting the weight to 3 parts by weight or less, gelation caused from an abnormal reaction with the polyamide 6 resin (A) is suppressed. This is less likely to disadvantageously cause machine stoppage caused by an increased load during extrusion-molding by deteriorated melt flowability. Furthermore, the take-up speed at strand break increases, to be less likely to disadvantageously cause the extrusion-molded article having an uneven thickness, which is preferable.

Preferred ethylene/α-olefin copolymers are copolymers of ethylene and α-olefins having 3 to 20 carbon atoms. Specific examples of the α-olefins having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. Two or more of these may be used. Among these α-olefins, α-olefins having 3 to 12 carbon atoms are preferable from the viewpoint of improving mechanical strength. Furthermore, at least one of unconjugated dienes such as 1,4-hexadiene, dicyclopentadiene, 2,5-norbornadiene, 5-ethylidenenorbornene, 5-ethyl-2,5-norbornadiene, and 5-(1'-propenyl)-2-norbornene may be copolymerized. Copolymers of ethylene modified with an unsaturated carboxylic acid and/or its derivative and α-olefins having 3 to 12 carbon atoms are more preferable because such copolymers can further improve the compatibility with the polyamide 6 resin (A), to provide further improved extrusion moldability and toughness. The occurrence of defects can be suppressed even if charging and discharging of higher-pressure hydrogen gas are repeated. The α-olefin content of the ethylene/α-olefin copolymer is preferably 1 to 30 mol %, more preferably 2 to 25 mol %, and still more preferably 3 to 20 mol %.

The composition and structure of fine particles of the impact modifier (B) are not particularly limited, and may be a so-called "core-shell" multilayer structure including at least one layer made of rubber and one or more layers made of polymers different from the rubber. The number of layers constituting the multilayer structure may be two or more, or may be three or more or four or more, but the multilayer structure preferably has at least one inner rubber layer (core layer). Examples of the type of rubber constituting the rubber layer of the multilayer structure include, but are not limited to, rubbers obtained by polymerizing acrylic components, silicone components, styrene components, nitrile components, conjugated diene components, urethane components, ethylene components, propylene components, and isobutene components and the like. The different polymers constituting the layers other than the rubber layer of the multilayer structure are not particularly limited as long as the polymers are any polymers having thermoplasticity, but the different polymer are preferably polymers having glass transition temperatures higher than that of the rubber layer. In a copolymer composition, an amount of modification, and a structure used as the impact modifier, the different polymers may have a glass transition temperature of 0° C. or lower. Examples of the polymers having thermoplasticity include polymers containing unsaturated carboxylic acid alkyl ester units, unsaturated carboxylic acid units, unsaturated-glycidyl-containing units, unsaturated dicarboxylic anhydride units, aliphatic vinyl units, aromatic vinyl units, vinyl cyanide units, maleimide units, unsaturated dicarboxylic acid units, and other vinyl units.

Metal Halide (C)

Examples of the metal halides (C) include alkali metal halides such as lithium iodide, sodium iodide, potassium iodide, lithium bromide, sodium bromide, potassium bromide, lithium chloride, sodium chloride, and potassium chloride; alkali earth metal halides such as magnesium iodide, calcium iodide, magnesium bromide, calcium bromide, magnesium chloride, and calcium chloride; Group 7 metal halides such as manganese(II) iodide, manganese(II) bromide, and manganese(II) chloride; Group 8 metal halides such as iron(II) iodide, iron(II) bromide, and iron(II) chloride; Group 9 metal halides such as cobalt(II) iodide, cobalt(II) bromide, and cobalt(II) chloride; Group 10 metal halides such as nickel(II) iodide, nickel(II) bromide, and nickel(II) chloride; Group 11 metal halides such as copper(I) iodide, copper(I) bromide, and copper(I) chloride; Group 12 metal halides such as zinc iodide, zinc bromide, and zinc chloride; Group 13 metal halides such as aluminum(III) iodide, aluminum(III) bromide, and aluminum(III) chloride; Group 14 metal halides such as tin(II) iodide, tin(II) bromide, and tin(II) chloride; and Group 15 metal halides such as antimony triiodide, antimony tribromide, antimony trichloride, bismuth(III) iodide, bismuth(III) bromide, and bismuth(III) chloride. Two or more of these may be used in combination.

Among these, alkali metal halides and/or copper iodide are preferable from the viewpoints of being easily available, having excellent dispersibility in the polyamide 6 resin (A), having higher reactivity with radicals, and further improving melt stability. Among the alkali metal halides, an alkali metal iodide is more preferably used from the viewpoint of reducing the amount of gas generated.

Polyamide Resin Composition

The polyamide resin composition contains 70 to 99 parts by weight of a polyamide 6 resin (A), 1 to 30 parts by weight of an impact modifier (B), and 0.005 to 1 parts by weight of a metal halide (C) with respect to a total of 100 parts by weight of the polyamide 6 resin (A) and the impact modifier (B).

If the blending amount of the polyamide 6 resin (A) is less than 70 parts by weight, the gas barrier properties of an extrusion-molded article made of the polyamide resin composition to be obtained are deteriorated. Defects occur if charging and discharging of high-pressure hydrogen gas are repeated. The blending amount of the polyamide 6 resin (A) is preferably 75 parts by weight or more, and more preferably 80 parts by weight or more. Meanwhile, if the blending amount of the polyamide 6 resin (A) is more than 99 parts by weight, the toughness of an extrusion-molded article made of the polyamide resin composition to be obtained is deteriorated. Cracks occur if charging and discharging of high-pressure hydrogen gas are repeated. The blending amount of the polyamide 6 resin (A) is preferably 97 parts by weight or less, and more preferably 95 parts by weight or less.

The blending amount of the impact modifier (B) is 1 to 30 parts by weight, preferably 3 parts by weight or more, and more preferably 5 parts by weight or more. The blending amount of the impact modifier (B) is preferably 25 parts by weight or less, and more preferably 20 parts by weight or less. If the blending amount of the impact modifier (B) is less than 1 part by weight, the toughness of an extrusion-molded article made of the polyamide resin composition to be obtained is deteriorated. If charging and discharging of high-pressure hydrogen gas are repeated, cracks occur. Meanwhile, if the blending amount of the impact modifier (B) is more than 30 parts by weight, the gas barrier properties of an extrusion-molded article made of the polyamide resin composition to be obtained are deteriorated, defects occur if charging and discharging of high-pressure hydrogen gas are repeated.

The blending amount of the metal halide (C) is preferably 0.005 to 1 part by weight with respect to a total of 100 parts by weight of the polyamide 6 resin (A) and the impact modifier (B), but if the blending amount of the metal halide (C) is less than 0.005 parts by weight, the melt stability during extrusion-molding of a polyamide resin composition to be obtained is deteriorated, which causes an extrusion-molded article having deteriorated toughness. The blending amount of the metal halide (C) is preferably 0.02 parts by weight or more, and more preferably 0.04 parts by weight or more, from the viewpoint of further improving the melt stability. Meanwhile, when the blending amount of the metal halide (C) is more than 1 part by weight, self-aggregation of the metal halide (C) proceeds and thereby the dispersion diameter becomes coarse so that the extrusion-molded article made of the polyamide resin composition to be obtained has deteriorated mechanical properties. The coarse dispersed particle causes a lowered surface area to cause a lowered reaction between the metal halide (C) and radicals so that the melt stability during extrusion-molding of the polyamide resin composition to be obtained is deteriorated, which causes the extrusion-molded article having deteriorated toughness. The blending amount of the metal halide (C) is preferably 0.5 parts by weight or less, and more preferably 0.3 parts by weight or less.

In a method of providing a polyamide resin composition having a high melt tension and a high take-up speed at strand broke, the dispersion diameter of the impact modifier (B) is desirably small. In a method of reducing the dispersion diameter of the impact modifier (B), for example, it is preferable that a resin is kneaded while a resin temperature is controlled to a relatively high temperature range of 235° C. to 330° C. The resin temperature is a value measured by directly inserting a contact-type resin thermometer into a die hole. The dispersion diameter of the impact modifier (B) dispersed in the polyamide resin composition can be finely controlled; an interface between the polyamide 6 resin (A) and the impact modifier (B) increases; the melt tension of the polyamide resin composition increases; and the polyamide resin composition is likely to be uniformly extruded and taken-up. This makes it possible to withstand a high take-up speed at strand broke, which is preferable. The average dispersion diameter of the impact modifier (B) dispersed in the polyamide resin composition is preferably 0.01 μm or more and 0.5 μm or less, more preferably 0.02 μm or more and 0.3 μm or less, and still more preferably 0.05 μm or more and 0.2 μm or less.

The average dispersion diameter of the impact modifier (B) can be calculated, for example, by cutting an ultrathin section from a polyamide resin composition pellet, staining the impact modifier (B) in the cross section of the ultrathin section, observing the ultrathin section using a transmission electron microscope, and determining the diameter of dispersed particles by image analysis. When the particles are not perfect circles, average values of major axes and minor axes are calculated, and the average dispersion diameter is calculated as an average value of the major axes and the minor axes.

With the polyamide resin composition, other components than the components (A), (B), and (C) may be blended if necessary, as long as the properties of the composition are not impaired. Examples of the other components include fillers, thermoplastic resins other than the component (A), and various additives.

For example, the filler is blended, whereby a molded article having improved strength and dimensional stability and the like can be provided. The shape of the filler may be fibrous or non-fibrous, and a fibrous filler and a non-fibrous filler may be used in combination. Examples of the fibrous fillers include glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, and metal fibers. Examples of the non-fibrous fillers include silicates such as wollastonite, zeolite, sericite, kaolin, mica, clay, pyrophyllite, bentonite, asbestos, talc, and alumina silicate; metal oxides such as alumina, silicon oxide, magnesium oxide, zirconium oxide, titanium oxide, and iron oxide; metal carbonates such as calcium carbonate, magnesium carbonate, and dolomite; metal sulfates such as calcium sulfate and barium sulfate; metal hydroxides such as magnesium hydroxide, calcium hydroxide, and aluminum hydroxide; and glass beads, ceramic beads, boron nitride, and silicon carbide. These fillers may be hollow. These fibrous fillers and/or non-fibrous fillers are preferably pre-treated with coupling agents before use to provide more excellent mechanical properties. Examples of the coupling agents include isocyanate compounds, organic silane compounds, organic titanate compounds, organic borane compounds, and epoxy compounds.

Examples of the thermoplastic resins include polyamide resins other than the polyamide 6 resin (A), polyester resins, polyphenylene sulfide resins, polyphenylene oxide resins, polycarbonate resins, polylactic resins, polyacetal resins, polysulfone resins, polytetrafluoroethylene resins, polyetherimide resins, polyamide-imide resins, polyimide resins, polyethersulfone resins, polyether ketone resins, polythioether ketone resins, polyether ether ketone resins, styrene resins such as polystyrene resins and ABS resins, and polyalkylene oxide resins. Two or more of these thermoplastic resins may be blended. The blending amount of the polyamide resin other than the polyamide 6 resin (A) is preferably 4 parts by weight or less with respect to 100 parts by weight of the polyamide 6 resin (A).

Examples of the various additives include anti-coloring agents, antioxidants such as hindered phenols and hindered amines, release agents such as ethylene bisstearyl amides and higher fatty acid esters, plasticizers, heat stabilizers, lubricants, ultraviolet absorbers, coloring agents, flame retardants, and blowing agents.

The polyamide resin composition has a melt tension of 20 mN or more when measured at 260° C. and a take-up speed at strand break of 30 m/min or more when measured at 260° C. If the melt tension of the polyamide resin composition when measured at 260° C. is 20 mN or more and the take-up speed at strand break when measured at 260° C. is 30 m/min or more, the polyamide resin composition is likely to be uniformly stretched during extrusion-molding, and can suppress thickness deviation low, and the occurrence of defects and cracks when charging and discharging of high-pressure hydrogen gas are repeated.

The polyamide resin composition preferably has a melt tension of 20 to 500 mN, more preferably 25 to 500 mN, and still more preferably 30 to 300 mN. The melt tension of the polyamide resin composition when measured at 260° C. is 20 mN or more that can suppress drawdown during extrusion molding to provide an extrusion-molded article. The melt tension of the polyamide resin composition when measured at 260° C. is 500 mN or less, which suppresses deterioration in stretchability to provide excellent extrusion moldability.

The polyamide resin composition preferably has a take-up speed at strand break of 30 m/min or more, more preferably 50 m/min or more, and still more preferably 70 m/min or more. The take-up speed at strand break of the polyamide resin composition when measured at 260° C. is 30 mN or more, which can provide an extrusion molding product with uniform thickness, provide a less residual strain, and suppress a stress concentration when charging and discharging of high-pressure hydrogen gas are repeated, whereby the occurrence of defect points and cracks can be suppressed.

The melt tension of the polyamide resin composition is measured as follows. Capillograph 1C (cylinder inner diameter: 9.55 mm, orifice length: 10.0 mm, inner diameter: 1.0 mm) manufactured by Toyo Seiki Seisakusho Co., Ltd. is used, and a test temperature is set to 260° C. A polyamide resin composition is filled in a cylinder, compacted, and held for 20 minutes to melt the polyamide resin composition. Then, the melted resin is extruded in a strand form at 260° C. from an orifice at a piston speed of 10 mm/min. This strand is wound through a lower circular guide of a tension detection pulley at a take-up speed of 10 m/min, and a tension to be detected is taken as the melt tension of the polyamide resin composition.

The means for setting the melt tension of the polyamide resin composition within the above range is not particularly limited as long as such a polyamide resin composition can be obtained, but a method using a polyamide 6 resin (A) having a relative viscosity of 3.3 to 7.0, as measured at 25° C. in a 98% concentrated sulfuric acid solution having a resin concentration of 0.01 g/ml, and a method using an ethylene/α-olefin copolymer modified with an unsaturated carboxylic acid and/or its derivative as the impact modifier (B) are preferably used. A method using an ethylene/α-olefin copolymer modified with 0.1 to 3 parts by weight of an unsaturated carboxylic acid and/or its derivative with respect to 100 parts by weight of the ethylene/α-olefin copolymer is preferably used. Specifically, an impact modifier (B) is preferably used, in which an amount of an unsaturated carboxylic acid and/or its derivative introduced from the modification is 0.1 to 3 parts by weight with respect to 100 parts by weight of the ethylene/α-olefin copolymer modified with an unsaturated carboxylic acid and/or its derivative.

The take-up speed at strand break of the polyamide resin composition is measured as follows. Capillograph 1C (cylinder inner diameter: 9.55 mm, orifice length: 10.0 mm, inner diameter: 1.0 mm) manufactured by Toyo Seiki Seisakusho Co., Ltd. is used, and a test temperature is set to 260° C. A polyamide resin composition is filled in a cylinder, compacted, and held for 20 minutes to melt the polyamide resin composition. Then, the melted resin is extruded in a strand form at 260° C. from an orifice at a piston speed of 10 mm/min. This strand is wound through a lower circular guide of a tension detection pulley at a take-up speed of 10 m/min to stabilize a tension to be detected. After the tension is stabilized, the strand is wound while the take-up speed is accelerated at an acceleration of 400 m/min$^2$, and a take-up speed at the time when the strand is broken is taken as the take-up speed at strand break of the polyamide resin composition. A limit value for measuring the take-up speed at strand break of the polyamide resin composition in the above measuring method is 200 m/min, but if other measuring methods are used, the limit value may be 200 m/min or more.

The take-up speed at strand break of the polyamide resin composition when measured at 260° C. is 30 mN or more, which can provide an extrusion molding product with uniform thickness, provide thickness deviation, and suppress a stress concentration when charging and discharging of high-pressure hydrogen gas are repeated, whereby the occurrence of defect points and cracks can be suppressed.

The means for setting the take-up speed at strand break of the polyamide resin composition within the above range is not particularly limited as long as such a polyamide resin composition can be obtained, but a method using an ethylene/α-olefin copolymer modified with an unsaturated carboxylic acid and/or its derivative as the impact modifier (B) is preferably used. A method using a modified ethylene/α-olefin copolymer modified with 0.1 to 3 parts by weight of an unsaturated carboxylic acid and/or its derivative with respect to 100 parts by weight of the ethylene/α-olefin copolymer is preferably used. Specifically, preferred is a method using an impact modifier (B) in which an amount of an unsaturated carboxylic acid and/or its derivative introduced from the modification is 0.1 to 3.0 parts by weight with respect to 100 parts by weight of an ethylene/α-olefin copolymer modified with an unsaturated carboxylic acid and/or its derivative.

Examples of the method of producing the polyamide resin composition include production in a melt state and production in a solution state. From the viewpoint of productivity, production in a melt state can be preferably used. For production in a melt state, melt-kneading with an extruder, a Banbury mixer, a kneader, or a mixing roll or the like can be used, and from the viewpoint of productivity, melt-kneading with an extruder allowing continuous production can be preferably used. Examples of the extruder include a single-screw extruder, a twin-screw extruder, a multi-screw extruder such as a four-screw extruder, and a twin-screw single-screw composite extruder. A plurality of these extruders may be combined. From the viewpoint of improving kneadability, reactivity, and productivity, a multi-screw extruder such as a twin-screw extruder or a four-screw extruder is preferable, and a twin-screw extruder is more preferable.

Examples of the melt-kneading method using the twin-screw extruder include a technique in which a polyamide 6 resin (A), an impact modifier (B), a metal halide (C) and, if necessary, components other than the components (A), (B), and (C) are premixed, and the mixture is supplied to a twin-screw extruder whose a cylinder temperature is set to be equal to or higher than the melting point of the polyamide 6 resin (A) to melt-knead the mixture. The mixing order of the raw materials is not particularly limited, and the following methods may be used: all raw materials are melt-kneaded by the above method; some raw materials are melt-kneaded by the above method, and the melt-kneaded product is blended with the remaining raw materials, followed by melt-kneading; and some raw materials are melt-kneaded while the remaining raw materials are mixed by using a side feeder. A method removing gas generated by exposing raw materials to a vacuum state in an extruder is also preferably used.

A resin temperature during melt-kneading using a twin-screw extruder is preferably controlled to 235° C. to 330° C. By controlling the resin temperature during melt-kneading to 235° C. or higher, the dispersion diameter of the impact modifier (B) dispersed in the polyamide resin composition can be finely controlled; an interface between the polyamide 6 resin (A) and the impact modifier (B) increases; the melt tension increases; and the polyamide resin composition is likely to be uniformly stretched. This makes it possible to withstand a high take-up speed at strand broke, which is preferable. The resin temperature during melt-kneading is controlled to 330° C. or lower, whereby the decomposition of the polyamide 6 resin (A) and impact modifier (B) is suppressed; the melt tension further increases; and the resin is uniformly extruded and taken up. This makes it possible to withstand a high take-up speed at strand broke, which is preferable. The resin temperature referred to here is a value measured by directly inserting a contact-type resin thermometer into a die hole.

The polyamide resin composition can be extrusion-molded to provide a molded article. Examples of the shape of the molded article include a pellet shape, a plate shape, a fibrous shape, a strand shape, a film or sheet shape, a pipe shape, and a hollow shape, and an extrusion-molded article having a pipe shape is preferably used.

In the extrusion-molded article having a pipe shape, a standard deviation σ of thicknesses of parts obtained by dividing the extrusion-molded article into four in a circumferential direction is preferably 0.1 or less. If the standard deviation of the thicknesses of the parts obtained by dividing the extrusion-molded article having a pipe shape into four in the circumferential direction is more than 0.1, the thickness of the extrusion-molded article is non-uniform, resulting in a large residual strain. A stress concentration when charging and discharging of high-pressure hydrogen gas are repeated increases so that defects and cracks are apt to occur.

The extrusion-molded product having a pipe shape can suppress the occurrence of defects and cracks even if charging and discharging of higher-pressure hydrogen gas are repeated, whereby the standard deviation of the thicknesses of the four parts divided in a circumferential direction is preferably 0.09 or less, and more preferably 0.08 or less.

The thickness of the extrusion-molded article having a pipe shape is measured by using a point micrometer at the center of an arc of each of the extruded product pieces obtained by dividing the extrusion-molded article having a pipe shape into four in the circumferential direction. The standard deviation σ of the thicknesses can be calculated by formulae (1), (2) and (3) using the obtained thicknesses $x_k$.

$$x=(1/4)\Sigma x_k (k=1 \text{ to } 4) \quad (1)$$

$$V=(1/4)\Sigma(x_k-x)^2 (k=1 \text{ to } 4) \quad (2)$$

$$\sigma=\sqrt{V} \quad (3)$$

x: Average of thicknesses at four locations
$x_k$: Thickness at each location (mm)
V: Dispersion of thickness
σ: Standard deviation of thicknesses The thickness of the extrusion-molded article in which the standard deviation σ of the thicknesses of the parts obtained by dividing the extrusion-molded article having a pipe shape into four in the circumferential direction is 0.1 or less is not particularly limited, but it is more preferably within a range of 0.5 mm to 5 mm, and preferably 1.0 mm to 4 mm. The thickness of the extrusion-molded article is a thickness obtained by using the above formula (1).

To set the standard deviation of the thicknesses of the parts obtained by dividing the extrusion-molded article into four in the circumferential direction to 0.1 or less, for example, the polyamide resin composition is used, which has a melt tension of 20 mN or more when measured at 260° C. and a take-up speed at strand break of 30 m/min or more when measured at 260° C.

The extrusion-molded article is used for an extrusion-molded article exposed to high-pressure hydrogen gas, taking advantage of its excellent feature suppressing the occurrence of defects even if charging and discharging of high-pressure hydrogen gas are repeated. The extrusion-molded article exposed to high-pressure hydrogen gas as used herein is an extrusion-molded article exposed to hydrogen gas at a normal pressure or more. Since the extrusion-molded article exhibits an effect of suppressing the occurrence of defects when charging and discharging of high-pressure hydrogen gas are repeated, the extrusion-molded article is preferably used in the application of the extrusion-molded article exposed to hydrogen gas at a pressure of 20 MPa or more, and more preferably used in the application of the extrusion-molded article exposed to hydrogen gas at a pressure of 30 MPa or more. Meanwhile, the extrusion-molded article is preferably used in the application of the extrusion-molded article exposed to hydrogen gas at a pressure of 200 MPa or less, more preferably used in the application of the extrusion-molded article exposed to hydrogen gas at a pressure of 150 MPa or less, and still more preferably used in the application of the extrusion-molded article exposed to hydrogen gas at a pressure of 100 MPa or less. Examples of the extrusion-molded article exposed to hydrogen gas include a hose for high-pressure hydrogen gas, a tank for high-pressure hydrogen gas, a tank liner for high-pressure hydrogen gas, a pipe for high-pressure hydrogen gas, a pressure sensor for high-pressure hydrogen gas, a pump for high-pressure hydrogen gas, a tube for high-pressure hydrogen gas, a film for high-pressure hydrogen gas, a sheet for high-pressure hydrogen gas, and a fiber for high-pressure hydrogen gas. Above all, the blow-molded article can be preferably used for high-pressure hydrogen gas containers such as tanks for high-pressure hydrogen gas and tank liners for high-pressure hydrogen gas.

EXAMPLES

Hereinafter, characteristics of our compositions and extrusion-molded products will be more specifically described with reference to Examples. This disclosure is not limited to the following Examples. Evaluations in Examples and Comparative Examples were conducted by the following methods.

(1) Resistance to Repeated Charging and Discharging of High-Pressure Hydrogen Gas (Defects)

Extrusion-molded articles obtained in Examples 1 to 4 and Comparative Examples 4, 5, 7 and 8 were subjected to X-ray CT analysis to observe the presence or absence of defects. An extrusion-molded article having no defects was placed in an autoclave, and hydrogen gas was then injected into the autoclave over five minutes to a pressure of 20 MPa. The pressure was held for 1 hour and then reduced to atmospheric pressure over five minutes. This was set as one cycle and repeated for 100 cycles. Test pieces after 100 cycles were subjected to X-ray CT analysis using "TDM1000-IS" manufactured by Yamato Scientific Co., Ltd. to observe the presence or absence of defects of 10 μm or more. Test pieces having no defects were taken as "absence", and test pieces having defects were taken as "presence".

(2) Tensile Elongation (Toughness)

Five test pieces having a height of 100 mm and a width of 5 mm were cut out with an extrusion-molding direction as a height direction from each of the extrusion-molded articles (thickness: about 3 mm) obtained in Examples 1 to 4 and Comparative Examples 4, 5, 7, and 8. Each of the test pieces was subjected to humidity conditioning for 30 minutes under the conditions of a temperature of 23° C. and a humidity of 50%, and then subjected to a tensile test at a distance between chucks of 50 mm and a speed of 10 mm/min to evaluate the tensile elongation of the test piece. The average value of measured values of the five test pieces was taken as the tensile elongation. The tensile elongation of the extrusion-molded article, of 50% or more indicates toughness maintained even after heat is applied during extrusion-molding, and high thermal stability.

(3) Melt Tension

With the pellets obtained in each of Examples and Comparative Examples, the polyamide resin composition is filled in a cylinder in which a test temperature is set to 260° C. using Capillograph 1C (cylinder inner diameter: 9.55 mm, orifice length: 10.0 mm, inner diameter: 1.0 mm) manufactured by Toyo Seiki Seisakusho Co., Ltd. The pellets are compacted and held for 20 minutes to melt the pellets, and the melted resin is then extruded in a strand form at 260° C. from an orifice at a piston speed of 10 mm/min. This strand was wound through a lower circular guide of a tension detection pulley at a take-up speed of 10 m/min, and a tension to be detected was taken as the melt tension of the polyamide resin composition.

(4) Take-Up Speed at Strand Break

With the pellets obtained in each of Examples and Comparative Examples, the polyamide resin composition is filled in a cylinder in which a test temperature is set to 260° C. using Capillograph 1C (cylinder inner diameter: 9.55 mm, orifice length: 10.0 mm, inner diameter: 1.0 mm) manufactured by Toyo Seiki Seisakusho Co., Ltd. The pellets are compacted and held for 20 minutes to melt the pellets, and the melted resin is then extruded in a strand form at 260° C. from an orifice at a piston speed of 10 mm/min. This strand was wound through a lower circular guide of a tension detection pulley at a take-up speed of 10 m/min to stabilize a tension to be detected. After the tension was stabilized, the strand was wound while the take-up speed was accelerated at an acceleration of 400 m/min², and a take-up speed at the time when the strand was broken was taken as the take-up speed at strand break of the polyamide resin composition.

(5) Standard Deviation of Thicknesses of Parts Obtained by Dividing Extrusion-Molded Article into Four in Circumferential Direction (Standard Deviation of Thicknesses of Extrusion-Molded Article)

For the extrusion-molded articles obtained in Examples 1 to 4 and Comparative Examples 4, 5, 7, and 8, the center of an arc of each of extrusion-molded article pieces divided into four in a circumferential direction was measured using a point micrometer, and the standard deviation σ of thicknesses $x_k$ to be obtained was calculated by formulae (1), (2) and (3).

$$x=(1/4)\Sigma x_k (k=1 \text{ to } 4) \quad (1)$$

$$V=(1/4)\Sigma(x_k-x)^2 (k=1 \text{ to } 4) \quad (2)$$

$$\sigma=\sqrt{V} \quad (3)$$

x: Average of thicknesses at four locations
$x_k$: Thickness at each location (mm)
V: Dispersion of thickness
σ: Standard deviation of thicknesses Raw materials used in Examples and Comparative Examples and abbreviations thereof will be described below.

Raw Materials of Polyamide 6 Resin (A) and Abbreviations Thereof

PA6 (ηr2.7): Polyamide 6 resin (relative viscosity at 25° C. in a 98% concentrated sulfuric acid solution having a resin concentration of 0.01 g/ml: 2.70)

PA6 (ηr3.0): Polyamide 6 resin (relative viscosity at 25° C. in a 98% concentrated sulfuric acid solution having a resin concentration of 0.01 g/ml: 3.00)

PA6 (ηr4.4): Polyamide 6 resin (relative viscosity at 25° C. in a 98% concentrated sulfuric acid solution having a resin concentration of 0.01 g/ml: 4.40)

PA6/PA66 copolymer: Polyamide 6/polyamide 66 copolymer (melting point: 190° C., relative viscosity at 25° C. in a 98% concentrated sulfuric acid solution having a resin concentration of 0.01 g/ml: 4.20)

Raw Materials of Impact Modifier (B) and Abbreviations Thereof

Impact Modifier 1: ethylene/1-butene copolymer (MFR (190° C., load of 2160 g) 0.5 g/10 minutes, density: 0.862 g/cm³)

Impact Modifier 2: 1.05 parts by weight of maleic anhydride and 0.04 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm³, and the mixture is melt-extruded at a cylinder temperature of 230° C. using a twin-screw extruder to obtain an impact modifier 2. The obtained impact modifier 2 is an ethylene/1-butene copolymer modified with maleic anhydride, and the amount of the ethylene/1-butene copolymer modified with respect to 100 parts by weight of the ethylene/1-butene copolymer is 1.0 part by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 1.0 part by weight.

For the measurement of each part by weight, 100 parts by weight of an ethylene/1-butene copolymer and 1.05 parts by weight of maleic anhydride are melt-kneaded, and the weight of pellets of the obtained ethylene/1-butene copolymer into which an unsaturated carboxylic acid has been introduced is measured. The weight of the unsaturated carboxylic acid-modified part is obtained by dissolving an unsaturated carboxylic acid in xylene at 130° C., preparing an ethanol titration solution of 0.02 mol/L potassium hydroxide (manufactured by Aldrich) as a titration solution, and an ethanol solution of 1% phenolphthalein as an indicator, and converting the molar concentration of the unsaturated carboxylic acid obtained by titration into mass. The weight of the unsaturated carboxylic acid-modified ethylene/1-butene copolymer was converted per 100 parts by weight, and taken as "the weight of the introduced unsaturated carboxylic acid-modified part".

Impact Modifier 3: 2.1 parts by weight of maleic anhydride and 0.1 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm³, and the mixture is melt-extruded at a cylinder temperature of 230° C. using a twin-screw extruder to obtain an impact modifier 3. The obtained impact modifier 3 is an ethylene/1-butene copolymer modified with maleic anhydride, and the amount of the ethylene/1-butene copolymer modified with respect to 100 parts by weight of the ethylene/1-butene copolymer is 2.0 parts by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 2.0 parts by weight.

Impact Modifier 4: 3.68 parts by weight of maleic anhydride and 0.3 parts by weight of a peroxide (manufactured by NOF Corporation, trade name: Perhexyne 25B) are mixed with 100 parts by weight of an ethylene/1-butene copolymer having an MFR (190° C., load of 2160 g) of 0.5 g/10 minutes and a density of 0.862 g/cm$^3$, and the mixture is melt-extruded at a cylinder temperature of 230° C. using a twin-screw extruder to obtain an impact modifier 4. The obtained impact modifier 4 is an ethylene/1-butene copolymer modified with maleic anhydride, and the amount of the ethylene/1-butene copolymer modified with respect to 100 parts by weight of the ethylene/1-butene copolymer is 3.5 parts by weight. Specifically, when the weight of an ethylene/1-butene copolymer whose a part of side chains are modified with maleic anhydride and into which an unsaturated carboxylic acid is introduced is 100 parts by weight, the weight of the introduced unsaturated carboxylic acid modified part is 3.5 parts by weight.

Raw Materials of Metal Halide (C) and Abbreviations Thereof

Metal halide 1: Copper iodide (I) (manufactured by Wako Pure Chemical Industries, Ltd.)

Metal halide 2: Potassium iodide (manufactured by Wako Pure Chemical Industries, Ltd.)

Examples 1 to 4 and Comparative Examples 4 and 5

A twin-screw extruder (TEX30α-35BW-7V, manufactured by JSW) (L/D=45, wherein L is a distance between a raw material supply port and a discharge port, and D is a diameter of a screw) had a cylinder temperature set to 240° C., a screw arrangement including one kneading zone, and a screw speed of 150 rpm. Raw materials shown in Tables 1 and 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. The obtained pellets are extruded from a die at an extrusion temperature of 260° C. using an extruder, passed through a sizing die, and then cooled to extrusion-mold an extrusion-molded article having a pipe shape having an outer diameter of approximately 100 mm and an inner diameter of 94 mm. Regarding the thickness, an average thickness x was calculated from Formula (1), and the results were described in Tables 1 and 2. The results of evaluating the obtained extrusion-molded article cut out to a length of 200 mm according to the above-mentioned method were described in Tables 1 and 2.

In Example 1, 85 parts by weight of PA6 (ηr=4.4) as the polyamide 6 resin (A), 15 parts by weight of the impact modifier 2, and 0.1 parts by weight of the metal halide 1 were kneaded. A resin temperature during melt-kneading was 265° C. The average dispersion diameter of the impact modifier 2 of the obtained pellets was 0.13 μm so that the impact modifier 2 was finely dispersed. The obtained pellets had a melt tension of 70 mN and a take-up speed at strand break of 150 m/min, which was good. The extrusion-molded article had no defects, and had a standard deviation of thicknesses of 0.046, which was good.

Example 2 was the same as Example 1 except that the impact modifier 2 of Example 1 was changed to the impact modifier 3. A resin temperature during melt-kneading was 272° C. The obtained pellets had a melt tension of 85 mN and a take-up speed at strand break of 107 m/min, which was good. The extrusion-molded article had no defects, and had a standard deviation of thicknesses of 0.043, which was good.

Example 3 was the same as Example 1 except that a metal halide 2 was added in addition to a metal halide 1. A resin temperature during melt-kneading was 267° C. The obtained pellets had a melt tension of 73 mN and a take-up speed at strand break of 165 m/min, which was good. The extrusion-molded article had no defects, and had a standard deviation of thicknesses of 0.044, which was good.

Example 4 was the same as Example 1 except that a ratio of PA6 to the impact modifier 2 was changed. A resin temperature during melt-kneading was 258° C. The obtained pellets had a melt tension of 31 mN and a take-up speed at strand break exceeding 200 m/min, which was good. The extrusion-molded article had no defects, and had a standard deviation of thicknesses of 0.061, which was within a range of causing no problem.

Meanwhile, in Comparative Example 4, an impact modifier 4 (the amount of an ethylene/1-butene copolymer modified with respect to 100 parts by weight of the ethylene/1-butene copolymer was 3.5 parts by weight) was used. The obtained pellets had a low melt tension of 98 mN and a low take-up speed at strand break of 27 m/min. The extrusion-molded article had defects, and had a large standard deviation of thicknesses of 0.122. Comparative Example 5 had no metal halide (C), and the extrusion-molded article had no defects, but burning occurred.

Comparative Examples 1 to 3 and 6

A twin-screw extruder (TEX30α-35BW-7V, manufactured by JSW) (L/D=45, wherein L is a distance between a raw material supply port and a discharge port, and D is a diameter of a screw) had a cylinder temperature set to 240° C., a screw arrangement including one kneading zone, and a screw speed of 150 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. When the obtained pellets were extruded from a die at an extrusion temperature of 260° C. using an extruder, drawdown occurred, which made it impossible to provide an extrusion-molded article.

In Comparative Examples 1 and 2, PA6 (ηr=2.7) was used. The obtained pellets had a small melt tension of 9 mN in Comparative Example 1 and 14 mN in Comparative Example 2, and a take-up speed at strand break exceeding 200 m/min.

In Comparative Example 3, an impact modifier 1 (no unsaturated carboxylic acid modification) was used. In Comparative Example 6, PA6 (ηr=3.0), a PA6/PA66 copolymer (ηr=4.2), and an impact modifier 2 were used, and respective ratios were changed. The obtained pellets had a small melt tension of 18 mN and a take-up speed at strand break of 180 m/min.

Comparative Example 7

A twin-screw extruder (TEX30α-35BW-7V, manufactured by JSW) (L/D=45, wherein L is a distance between a raw material supply port and a discharge port, and D is a diameter of a screw) had a cylinder temperature set to 225° C., a screw arrangement including one kneading zone, and a screw speed of 100 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. The obtained pellets are extruded from a die at an extrusion temperature of 260° C. using an extruder, passed through a sizing die, and then cooled to extrusion-mold an extrusion-molded article having a pipe shape having an outer diameter of approximately 100 mm and an inner diameter of 94 mm. Regarding the thickness, an average thickness x was calculated from Formula (1), and the results were described in Table 2. The results of evaluating the obtained extrusion-molded article cut out to a length of 200 mm according to the above-mentioned method were described in Table 2.

In Comparative Example 7, the resin composition was the same as that of Example 1, but a resin temperature during melting was as low as 232° C. The obtained pellets had a low melt tension of 19 mN and a take-up speed at strand break of 65 m/min. The average dispersion diameter of the impact modifier 2 of the obtained pellets was 0.62 μm so that the impact modifier 2 was coarsely dispersed. The extrusion-molded article had defects, and the extrusion-molded article had a large standard deviation of thicknesses of 0.12, which had a large variation.

Comparative Example 8

A twin-screw extruder (TEX30α-35BW-7V, manufactured by JSW) (L/D=45, wherein L is a distance between a raw material supply port and a discharge port, and D is a diameter of a screw) had a cylinder temperature set to 300° C., a screw arrangement including three kneading zones, and a screw speed of 300 rpm. Raw materials shown in Table 2 were supplied into the extruder and melt-kneaded. A gut discharged through a die at a speed of 20 kg/h was rapidly cooled by being passed through a cooling bath filled with water adjusted to 10° C. over 10 seconds, and then pelletized with a strand cutter to obtain pellets. The obtained pellets were vacuum dried in a vacuum dryer at 80° C. for 12 hours to obtain the dried pellets. The obtained pellets are extruded from a die at an extrusion temperature of 260° C. using an extruder, passed through a sizing die, and then cooled to extrusion-mold an extrusion-molded article having a pipe shape having an outer diameter of approximately 100 mm and an inner diameter of 94 mm. Regarding the thickness, an average thickness x was calculated from Formula (1), and the results were described in Table 2. The results of evaluating the obtained extrusion-molded article cut out to a length of 200 mm according to the above-mentioned method were described in Table 2.

In Comparative Example 8, the resin composition was the same as that of Example 1, but a resin temperature during melting was as high as 340° C. The obtained pellets had a low melt tension of 19 mN and a take-up speed at strand break of 72 m/min. The extrusion-molded article had defects and had a large standard deviation of thicknesses of 0.118, which had a large variation.

TABLE 1

| | | | Example 1 | Example 2 | Example 3 | Example 4 |
|---|---|---|---|---|---|---|
| Composition | PA6 ($\eta r$ = 2.7) | Parts by weight | | | | |
| | PA6 ($\eta r$ = 3.0) | Parts by weight | | | | |
| | PA6 ($\eta r$ = 4.4) | Parts by weight | 85 | 85 | 85 | 90 |
| | PA6/PA66 copolymer | Parts by weight | | | | |
| | Impact modifier 1 | Parts by weight | | | | |
| | Impact modifier 2 | Parts by weight | 15 | | 15 | 10 |
| | Impact modifier 3 | Parts by weight | | 15 | | |
| | Impact modifier 4 | Parts by weight | | | | |
| | Metal halide 1 | Parts by weight | 0.1 | 0.1 | 0.1 | 0.1 |
| | Metal halide 2 | Parts by weight | | | 0.1 | |
| Evaluation results | Resin temperature during melt kneading (when pellets are obtained) | ° C. | 265 | 272 | 267 | 258 |
| | Defects | — | Absence | Absence | Absence | Absence |
| | Tensile elongation | % | 195 | 180 | 205 | 140 |
| | Melt tension | mN | 70 | 85 | 73 | 31 |
| | Take-up speed at strand break | m/min | 150 | 107 | 165 | >200 |
| | Average thickness of extrusion-molded article | mm | 3.02 | 3 | 3.02 | 3.03 |
| | Standard deviation of thicknesses of extrusion-molded article | — | 0.046 | 0.043 | 0.044 | 0.061 |

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Composition | PA6 ($\eta r$ = 2.7) | Parts by weight | 85 | 85 | | | | | | |
| | PA6 ($\eta r$ = 3.0) | Parts by weight | | | | | | | 62.5 | |

TABLE 2-continued

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| | PA6 (ηr = 4.4) | Parts by weight | | | 85 | 85 | 85 | | 85 | 85 |
| | PA6/PA66 copolymer | Parts by weight | | | | | | 20 | | |
| | Impact modifier 1 | Parts by weight | | | 15 | | | | | |
| | Impact modifier 2 | Parts by weight | 15 | | | | 15 | 17.5 | 15 | 15 |
| | Impact modifier 3 | Parts by weight | | 15 | | | | | | |
| | Impact modifier 4 | Parts by weight | | | | 15 | | | | |
| | Metal halide 1 | Parts by weight | 0.1 | 0.1 | 0.1 | 0.1 | | | 0.1 | 0.1 |
| | Metal halide 2 | Parts by weight | | | | | | | | |
| Evaluation results | Resin temperature during melt kneading (when pellets are obtained) | °C. | 242 | 246 | 249 | 293 | 263 | 250 | 232 | 340 |
| | Defects | — | Impossible extrusion molding | Impossible extrusion molding | Impossible extrusion molding | Presence | Absence | Impossible extrusion molding | Presence | Presence |
| | Tensile elongation | % | — | — | — | 105 | 30 | — | 32 | 31 |
| | Melt tension | mN | 9 | 14 | 18 | 98 | 68 | 18 | 19 | 19 |
| | Take-up speed at strand break | m/min | >200 | >200 | 25 | 27 | 125 | 180 | 65 | 72 |
| | Average thickness of extrusion-molded article | mm | — | — | — | 2.95 | 3.01 | — | 2.98 | 2.97 |
| | Standard deviation of thicknesses of extrusion-molded article | — | — | — | — | 0.122 | 0.052 | — | 0.120 | 0.118 |

From the above results, the polyamide resin composition contains the polyamide 6 resin (A), the impact modifier (B), and the metal halide (C), wherein the polyamide resin composition has a melt tension of 20 mN when measured at 260° C. and a take-up speed at strand break of 30 m/min when measured at 260° C. The polyamide resin composition has a high melt tension and excellent drawdown resistance, and can withstand a high take-up speed, whereby the polyamide resin composition provides less thickness deviation and excellent extrusion moldability.

We found that the extrusion-molded article obtained by molding such a polyamide resin composition can suppress thickness deviation low, suppresses the occurrence of defects even if charging and discharging of high-pressure hydrogen gas are repeated, and has excellent melt stability.

INDUSTRIAL APPLICABILITY

Since the polyamide resin composition has a high melt tension and excellent drawdown resistance, and can withstand a high take-up speed, the polyamide resin composition has excellent extrusion moldability and can suppress the thickness deviation of a molded article low, the polyamide resin composition suppresses the occurrence of defects even if charging and discharging of high-pressure hydrogen gas are repeated, and has excellent melt stability. The extrusion-molded article obtained by extrusion-molding the polyamide resin composition can be widely used for extrusion-molded articles exposed to high-pressure hydrogen gas by taking advantage of these properties.

The invention claimed is:

1. An extrusion-molded article adapted to be exposed to high-pressure hydrogen gas, comprising a polyamide resin composition, wherein said polyamide resin composition comprises:

75 to 90 parts by weight of a polyamide 6 resin (A);
10 to 25 parts by weight of an impact modifier (B); and
0.02 to 0.5 parts by weight of a metal halide (C) with respect to a total of 100 parts by weight of the polyamide 6 resin (A) and the impact modifier (B), wherein the polyamide 6 resin (A) has a relative viscosity (ηr) of 3.3 to 4.4 at a temperature of 25° C. in a 98% sulfuric acid solution having a resin concentration of 0.01 g/ml, the impact modifier (B) comprising an ethylene/α-olefin copolymer modified with an unsaturated carboxylic acid and/or its derivative, an amount of the unsaturated carboxylic acid and/or its derivative introduced from the modification is 0.3 to 2.5 parts by weight with respect to 100 parts by weight of the ethylene/α-olefin copolymer modified with the unsaturated carboxylic acid and/or its derivative, wherein an average dispersion diameter of the impact modifier (B) dispersed in the polyamide resin composition is 0.01 to 0.5 μm, and the polyamide resin composition has 1) a melt tension of 20 mN or more when measured at 260° C., and 2) a take-up speed at strand broke of 50 m/min or more when measured at 260° C.

2. The extrusion-molded article according to claim 1, wherein the metal halide (C) contains an alkali metal halide and/or copper iodide.

3. The extrusion-molded article according to claim 1, wherein the extrusion-molded article has a pipe shape.

4. The extrusion-molded article according to claim 3, wherein a standard deviation of thicknesses of parts obtained by dividing the extrusion-molded article having a pipe shape into four in a circumferential direction is 0.1 or less.

5. A method of producing a high-pressure hydrogen tank liner, comprising producing the extrusion-molded article according to claim 1, and welding the extrusion-molded article to a molded article made of a resin composition.

\* \* \* \* \*